United States Patent
Lee

(10) Patent No.: US 11,933,242 B2
(45) Date of Patent: Mar. 19, 2024

(54) EXHAUST GAS MONITORING SYSTEM AND METHOD

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/146,407

(22) Filed: Dec. 26, 2022

(65) Prior Publication Data
US 2023/0407808 A1    Dec. 21, 2023

(30) Foreign Application Priority Data
Jun. 16, 2022  (KR) .......................... 10-2022-0073392

(51) Int. Cl.
| | |
|---|---|
| *F02D 41/22* | (2006.01) |
| *F02D 41/00* | (2006.01) |
| *F02D 41/02* | (2006.01) |
| *G01K 13/02* | (2021.01) |
| *G01M 15/10* | (2006.01) |

(Continued)

(52) U.S. Cl.
CPC ......... *F02D 41/22* (2013.01); *F02D 41/0055* (2013.01); *F02D 41/0077* (2013.01); *F02D 41/027* (2013.01); *G01K 13/026* (2021.01); *G01M 15/102* (2013.01); *G06T 7/90* (2017.01); *G07C 5/0808* (2013.01); *G07C 5/0825* (2013.01); *F02D 2041/228* (2013.01); *F02D 2200/021* (2013.01); *G01K 2205/00* (2013.01); *G06T 2207/20084* (2013.01); *G06T 2207/30232* (2013.01); *G06T 2207/30252* (2013.01)

(58) Field of Classification Search
CPC ............ F02D 41/0055; F02D 41/0077; F02D 41/027; F02D 41/22; F02D 2041/228; F02D 2200/021; G01K 2205/00; G01M 15/102; G06T 7/90; G06T 2207/20084; G06T 2207/30252; G07C 5/0808; G07C 5/0825
See application file for complete search history.

(56) References Cited

U.S. PATENT DOCUMENTS

| | | | | |
|---|---|---|---|---|
| 10,013,821 B1 * | 7/2018 | Dudar | .................... | B64C 39/024 |
| 10,145,340 B1 * | 12/2018 | Dudar | ................. | F02D 41/0002 |
| 10,598,108 B2 * | 3/2020 | Dudar | ....................... | F02P 5/15 |

(Continued)

FOREIGN PATENT DOCUMENTS

| | | | | |
|---|---|---|---|---|
| CN | 102042986 A | * | 5/2011 | |
| CN | 112784642 A | * | 5/2021 | |

(Continued)

OTHER PUBLICATIONS

CMU, "Introduction to Machine Learning," accessed Sep. 23, 2023: https://www.cs.cmu.edu/~aarti/Class/10315_Spring22/315S22_Rec3. pdf (Year: 2022).*

*Primary Examiner* — Hung Q Nguyen
*Assistant Examiner* — Mark L. Greene
(74) *Attorney, Agent, or Firm* — Novo TechIP International PLLC

(57) ABSTRACT

Provided are an exhaust gas monitoring system and method for allowing a driver to monitor a state of an exhaust gas discharged from a vehicle during driving without getting out of the vehicle, thus improving convenience, and improving driving safety by diagnosing a state of an engine.

17 Claims, 3 Drawing Sheets

EXAMPLE OF REGION-OF-INTEREST(ROI) EXTRACTION FROM IMAGE DATA OF REAR OF VEHICLE

(51) Int. Cl.
*G06T 7/90* (2017.01)
*G07C 5/08* (2006.01)

(56) References Cited

U.S. PATENT DOCUMENTS

| | | | | |
|---|---|---|---|---|
| 10,843,702 | B2 * | 11/2020 | Dudar | ............... B60W 50/0205 |
| 10,900,857 | B2 * | 1/2021 | Dudar | .................. G01M 3/025 |
| 10,927,782 | B2 * | 2/2021 | Dudar | .................. G07C 5/0891 |
| 2021/0374412 | A1 * | 12/2021 | Cerri | ......................... G06T 7/90 |

FOREIGN PATENT DOCUMENTS

| | | | | |
|---|---|---|---|---|
| CN | 112990004 | A * | 6/2021 | ......... G06K 9/00751 |
| JP | 2008267837 | A * | 11/2008 | .......... G01M 15/108 |
| KR | 101229586 | B1 | 2/2013 | |

* cited by examiner

EXAMPLE OF REGION-OF-INTEREST(ROI) EXTRACTION FROM IMAGE DATA OF REAR OF VEHICLE

EXHAUST GAS MONITORING SYSTEM AND METHOD

CROSS-REFERENCE TO RELATED APPLICATIONS

This application claims priority under 35 U.S.C. § 119 to Korean Patent Application No. 10-2022-0073392, filed on Jun. 16, 2022, in the Korean Intellectual Property Office, the disclosure of which is incorporated herein by reference in its entirety.

TECHNICAL FIELD

The following disclosure relates to an exhaust gas monitoring system and method, and more particularly, to an exhaust gas monitoring system and method for identifying a state of an exhaust gas discharged from a vehicle during driving to relatively accurately diagnose and monitor a current state of an engine system.

BACKGROUND

Exhaust gas discharged from a vehicle during driving is a high-pressure gas generated during intake, compression, explosion, and exhaust processes performed in an engine.

In order to reduce environmental pollution, an exhaust gas discharged from vehicles has been regulated legally.

A state of a vehicle can be self-checked because a state of an engine system of an internal combustion engine can be easily identified by checking a color of an exhaust gas, but in a general driving situation, it is impossible for a driver to check the rear of a vehicle during driving, and particularly, an exhaust port (muffler) through which an exhaust gas is discharged. Thus, in order to check an exhaust gas from the vehicle that the driver is driving, the driver should start the engine to check a color of a discharged exhaust gas before starting driving or should check a color of an exhaust gas after getting out of the vehicle without turning off the engine.

In the former case, when the vehicle is started, the vehicle is in a cold start state and thus a state of the engine is difficult to check due to contraction of condensed water due to the difference between internal and external temperatures of the vehicle, i.e., because the engine is not sufficiently preheated, the reliability of an analysis value (determination value) of color information of the exhaust gas is low.

In the latter case, the driver must get out of the vehicle to check an exhaust gas without turning off the engine although driving is finished and thereafter must get back in the vehicle to turn off the engine, thus causing inconvenience to the user.

In addition, when the color of the exhaust gas is not clearly identifiable with the naked eye of a person with normal eyesight, the accuracy of a diagnosis may be low.

Korean Patent Registration No. 10-1229586 (entitled "Vehicle Exhaust Gas Particle Monitoring Device") discloses a technique for detecting the concentration of fine particles contained in an exhaust gas from a vehicle through a particle measurement sensor mounted at the rear of a smoke reduction device of a vehicle exhaust pipe and providing a result of the detection to a user.

SUMMARY

The present invention has been made in order to solve the problems as described above. An object of the present invention is to provide an exhaust gas monitoring system and method for monitoring a color of an exhaust gas, which is difficult for a driver to identify during driving, analyzing a state of an engine on the basis of the color of the exhaust gas, and providing a result of the analysis, thereby relatively accurately diagnosing and monitoring a current state of an engine system.

In a general aspect, an exhaust gas monitoring system includes an initial determiner configured to determine whether to analyze a state of an engine of a vehicle is possible on the basis of color information of an exhaust gas, an image collector configured to collect image data of the rear of a vehicle that is being driven, an image analyzer configured to analyze the image data and output color information corresponding to an exhaust gas region included in the image data, and an analysis processor configured to analyze the state of the engine of the vehicle on the basis of an analysis result obtained by the image analyzer, wherein the image collector collects the image data of the rear of the vehicle only when the initial determiner determines to analyze the state of the engine is possible on the basis of the color information of the exhaust gas.

The initial determiner may include a temperature collector configured to receive temperature information of a coolant of the vehicle, and a temperature responder configured to determine whether the temperature information of the coolant is higher than or equal to a preset critical temperature and process the state of the engine to be analyzed when it is determined that the temperature information is higher than or equal to the preset critical temperature.

The image analyzer may include an extractor configured to receive the image data of the rear of the vehicle and extract a region of interest (ROI) from the image data by using a preset algorithm, a classifier configured to perform class classification on color information for each pixel of the extracted ROI by using a previously stored network, and an outputter configured to output color information of the ROI on the basis of a result of the class classification.

The analysis processor may include a first determiner configured to determine whether the color information corresponds to preset first color information on the basis of the analysis result, a second determiner configured to receive information related to a current state of the engine of the vehicle and determine whether the current state corresponds to a regeneration mode when the first determiner determines that the color information does not correspond to the first color information, and a first processor configured to process the state of the engine of the vehicle as a normal state when the second determiner determines that the current state corresponds to the regeneration mode.

The analysis processor may further include a third determiner configured to determine whether the color information corresponds to preset second color information when the second determiner determines that the current state does not correspond to the regeneration mode, and a second processor configured to provide previously stored first notification generation information through a connected display means when the third determiner determines that the color information corresponds to the second color information.

The analysis processor may further include a fourth determiner configured to determine whether the color information corresponds to preset third color information when the third determiner determines that the color information does not correspond to the second color information, and a third processor configured to provide previously stored second notification generation information through the display means when the fourth determiner determines that the color information corresponds to the third color information.

The analysis processor may further include a fourth processor configured to provide previously stored third notification generation information through the display means when the fourth determiner determines that the color information does not correspond to the third color information.

The analysis processor may further include a first control requester configured to request a related means to control a cutoff frequency of a low-pass filter (LPF) corresponding to an acceleration pedal input value of the vehicle to be reduced when the fourth determiner determines that the color information does not correspond to the third color information, and a first re-determination processor configured to perform the operation of the image collector again when the related means operates in response to the request from the first control requester.

The analysis processor may further include a second control requester configured to request a related means to control a degree of openness of an exhaust gas recirculation (EGR) valve of the vehicle to be reduced when the fourth determiner determines that the color information does not correspond to the third color information, and a second re-determination processor configured to perform the operation of the image collector again when the related means operates in response to the request from the second control requester.

The exhaust gas monitoring system may further include an external outputter configured to provide the analysis result obtained by the image analyzer through a connected display means.

In another general aspect, there is provided an exhaust gas monitoring method in which each operation is performed by an exhaust gas monitoring system through an operation processing means, the exhaust gas monitoring method including a preheating determination operation (S100) of determining whether to analyze a state of an engine of a vehicle is possible on the basis of color information of an exhaust gas, an image input operation (S200) of collecting image data of the rear of a vehicle that is being driven when it is determined in the preheating determination operation (S100) that the state of the engine is to be analyzed, an image analysis operation (S300) of analyzing the image data collected in the image input operation (S200) and extracting color information corresponding to an exhaust gas region included in the image data, and an analysis processing operation (S400) of analyzing the state of the engine of the vehicle on the basis of the color information extracted in the image analysis operation (S300).

The preheating determination operation (S100) may include a temperature collection operation (S110) of receiving temperature information of a coolant of the vehicle, and a temperature determination operation (S120) of determining whether the temperature information of the coolant received in the temperature collection operation (S110) is higher than or equal to a preset critical temperature, and determining that the state of the engine is to be analyzed when the temperature information is higher than or equal to the preset critical temperature.

The image analysis operation (S300) may include a region-of-interest (ROI) extraction operation (S310) of extracting a ROI from the image data of the rear of the vehicle by using a preset algorithm, and a color information extraction operation (S320) of performing class classification on color information of each pixel of the ROI extracted in the ROI extraction operation (S310) and generating color information of the ROI on the basis of a result of the class classification.

The analysis processing operation (S400) may include a first determination operation (S410) of determining whether the color information corresponds to preset first color information, and a first analysis operation (S420) of analyzing the state of the engine of the vehicle is a normal state when it is determined in the first determination operation (S410) that the color information corresponds to the first color information.

The analysis processing operation (S400) may further include a second determination operation (S430) of receiving information related to a current state of the engine of the vehicle and determining whether the current state corresponds to a regeneration mode when it is determined in the first determination operation (S410) that the color information does not correspond to the first color information, and a second analysis operation (S440) of analyzing the state of the engine of the vehicle as a normal state when it is determined in the second determination operation (S420) that the current state corresponds to the regeneration mode.

The analysis processing operation (S400) may further include a third analysis operation (S450) of classifying the color information as one of preset second color information to fourth color information when it is determined in the first determination operation (S410) that the color information does not correspond to the first color information, and providing one of previously stored first notification generation information to third notification generation information, which corresponds to the classified color information through a connected display means.

The analysis processing operation (S400) may further include a first control request operation (S460) of requesting a related means to control a cutoff frequency of a low-pass filter (LPF) corresponding to an acceleration pedal input value of the vehicle to be reduced, when the color information is classified as the fourth color information in the third analysis operation (S450), and the exhaust gas monitoring method may be performed again starting from the image input operation (S200) when the related means operates according to the first request operation (S460).

The analysis processing operation (S400) may further include a second control request operation (S460) of requesting a related means to control a degree of openness of an exhaust gas recirculation (EGR) valve of the vehicle to be reduced, when the color information is classified as the fourth color information in the third analysis operation (S450), and the exhaust gas monitoring method is performed again starting from the image input operation (S200) when the related means operates according to the second control request operation (S460).

DETAILED DESCRIPTION

Hereinafter, an exhaust gas monitoring system and method according to an embodiment of the present invention will be described in detail with reference to the accompanying drawings.

A system is a set of components, including devices, instruments, means, etc., which are organized and regularly interact with each other to perform desired functions.

As described above, semantic information of a color of an exhaust gas is important information for relatively accurately identifying a state of an internal combustion engine (engine system) of a vehicle but it is impossible for a driver to directly check the color of the exhaust gas during driving.

A normal exhaust gas is colorless or has a light blue color, and a white exhaust gas may be discharged due to a contraction phenomenon due to condensed water or a temperature difference shortly after the engine is started, i.e., when the engine is not sufficiently pre-heated.

A phenomenon that an exhaust gas discharged from the engine is white gas in a state in which the engine is sufficiently preheated may occur when a coolant or mission oil flows into a cylinder due to cracks of a head gasket, a cylinder head, or an engine block, and a phenomenon that the exhaust gas is blue gas may occur when engine oil burns in a combustion chamber due to the abrasion of a piston ring, a cylinder, a valve, or the like. A phenomenon that the exhaust gas is black lead (black gas) may occur due to incomplete combustion of fuel, caused when an excessive amount of fuel is supplied to the engine or when a defect occurs in a fuel intake system due to the contamination of an air filter or the like.

To address the above-described problem, an exhaust gas monitoring system and method according to an embodiment of the present invention relate to a technique for monitoring a state of an exhaust gas on the basis of image data of the rear of a vehicle in a stable driving state in which the vehicle is sufficiently preheated.

Specifically, a temperature of a coolant may be collected to determine whether the engine of the vehicle is operating in a stable state and be input to a deep learning-based classification network with respect to a region (a muffler region) through which an exhaust gas is discharged to perform classification according to preset color classes (colorless/white/blue/black), and an alarm corresponding to a classification result may be generated, thereby allowing a driver to monitor an exhaust gas discharged during driving without getting out of the vehicle. Therefore, the driver's convenience can be improved, and the safety of driving can be improved by periodically diagnosing a state of the engine on the basis of a color of an exhaust gas.

Figure 1:
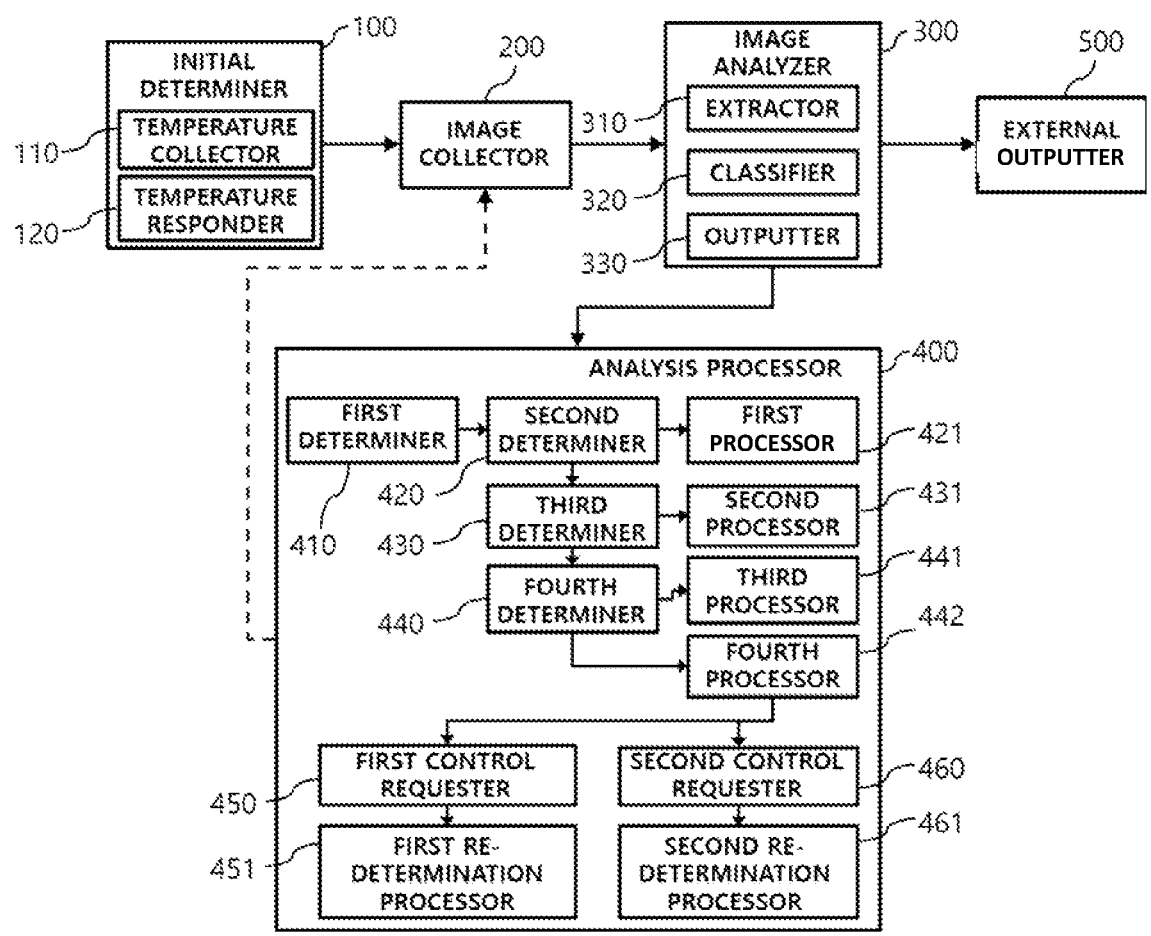
FIG. 1 is a diagram illustrating an example of an exhaust gas monitoring system according to an embodiment of the present invention.

FIG. 1 is a block diagram of an exhaust gas monitoring system according to an embodiment of the present invention.

As shown in FIG. 1, the exhaust gas monitoring system according to an embodiment of the present invention may include an initial determiner 100, an image collector 200, an image analyzer 300, and an analysis processor 400. These components may be operated by an operation processing means such as an electronic control unit (ECU) including a computer that performs transmission and reception through a communication channel in a vehicle.

These components will be described in detail below.

The initial determiner 100 determines whether analyzing a state of an engine of a vehicle is possible on the basis of color information of an exhaust gas. For example, the initial determiner 100 may determine whether the engine system of the vehicle is sufficiently preheated such that the reliability of analysis according to the present invention can be determined. It is understood that when the engine system of the vehicle is sufficiently preheated, color information of a discharged exhaust gas may represent a state of an internal combustion engine.

To this end, the initial determiner 100 includes a temperature collector 110 and a temperature responder 120 as shown in FIG. 1.

The temperature collector 110 receives temperature information of a coolant of a corresponding vehicle.

A colorless exhaust gas is discharged from an engine in a normal state, but when the engine is not sufficiently preheated, a white exhaust gas including vapor is discharged due to a contraction phenomenon due to a temperature difference between condensed water or cool air and the exhaust gas, and therefore, the temperature collector 110 receives temperature information of a coolant to determine whether the engine is sufficiently preheated.

The temperature responder 120 determines whether the temperature information of the coolant received from the temperature collector 110 is higher than or equal to a preset critical temperature, and processes the state of the engine to be analyzed when the temperature of the coolant is higher than or equal to the critical temperature.

That is, when the temperature of the coolant is higher than or equal to the critical temperature, it is determined that the engine is preheated sufficiently to analyze the state of the engine through an exhaust gas and a subsequent operation is performed.

Here, the critical temperature should be understood to mean a lowest temperature that is in a normal range that was set in advance during the design of a vehicle, and generally, a temperature of a coolant reaches a critical temperature a certain time after driving of the vehicle starts and thus the critical temperature is not limited.

The image collector 200 collects image data of the rear of a vehicle that is being driven.

In this case, the image collector 200 collects the image data of the rear of the vehicle only when the initial determiner 100 determines to analyze the state of the engine is possible by using the color information of the exhaust gas.

The image data of the rear of the vehicle is image data of the rear of the vehicle, which is generated by a rear camera or a surround view monitor (SVM) rear camera system, and embodiments are not limited to a related means that generates the image data of the rear of the vehicle provided that the rear of the vehicle can be monitored.

The image analyzer 300 analyzes the image data collected by the image collector 200 and outputs color information corresponding to an exhaust gas region included in the image data.

As shown in FIG. 1, the image analyzer 300 includes an extractor 310, a classifier 320, and an outputter 330.

The extractor 310 extracts a ROI from the image data collected by the image collector 200 using a preset algorithm, i.e., a preset region of interest (ROI) extraction algorithm.

Generally, an SVM rear camera system employs a fisheye lens having a wide angle of view, but an exhaust port region (muffler region) through which an exhaust gas is discharged is located at a center of an image and thus is less distorted by the fisheye lens.

Figure 2:
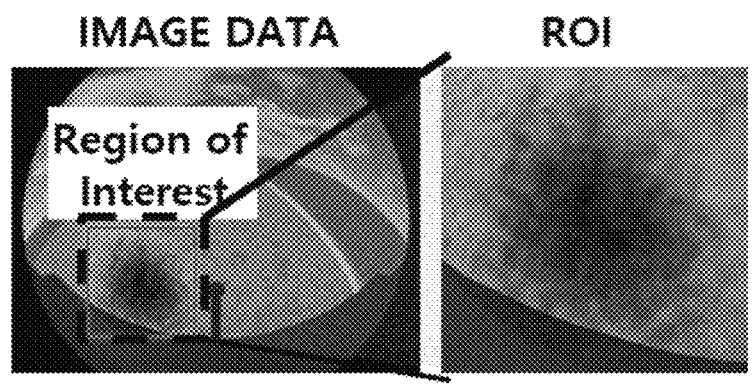
FIG. 2 is a diagram illustrating an example of an image analysis process performed by an exhaust gas monitoring system according to an embodiment of the present invention.

Therefore, the extractor 310 extracts an image of the exhaust port region as a ROI as shown in FIG. 2. Here, a desired region may be easily extracted from among all regions of an image as a ROI through a general ROI extraction algorithm and thus a detailed description thereof will be omitted here.

The classifier 320 performs class classification on color information of each pixel of the ROI extracted by the extractor 310 using a previously stored network.

Specifically, the classifier 320 uses a network consisting of a plurality of layers for performing convolution, batch normalization, a ReLU operation, etc., and abstracts features of pixels while reducing the size of an output through a pooling operation.

In addition, in order to solve a problem of an XOR classification, two fully connected layers are configured and a SoftMax operation function is applied to convert an output value of a network into a probability value corresponding to a predetermined class for each pixel and output the probability value.

For example, the output value of the network is converted into the sum of a value of probability that a pixel is colorless, a value of probability that the pixel is a white pixel, a value of probability that the pixel is a blue pixel, and a value of probability that the pixel is a black pixel, the sum of the values of probability is output, and, in this case, the sum of all of the values of probability for the pixel is 100%.

In order to diagnose a state of an engine using an exhaust gas, four classes (colorless/white/blue/black) were used, and for supervised learning, a loss value was calculated using a cross entropy loss lce as shown in Equation 1 below.

$$I_{CE} = -\sum_{i=1}^{4} t_i \log\left(\frac{e^{y_i}}{\sum_{j=1}^{4} e^{y_j}}\right)$$ [Equation 1]

Supervised learning uses a pair of image data and correct answer data t. In Equation 1 above, y denotes each class value before SoftMax. In order to minimize a loss value, weight was calculated by a stochastic gradient descent method.

The outputter 330 outputs color information of the ROI using a result of the class classification performed by the classifier 320.

That is, a representative value of each pixel is set as a class having a maximum value among SoftMax outputs of pixels by a trained network, and color information is output as a representative value corresponding to a largest number of pixels among all pixels of the ROI.

That is, when the ROI consists of 100 pixels and black is set to a representative value for 90 pixels among the 100 pixels, the outputter 330 sets color information of the ROI to black and outputs the color information.

The analysis processor 400 analyzes the state of the engine of the vehicle by using a result of analysis performed by the image analyzer 300.

That is, the analysis processor 400 analyzes the state of the engine (engine system) by using the color information of the ROI by the image analyzer 300, and to this end, the analysis processor 400 includes a first determiner 410, a second determiner 420, a first processor 421, a third determiner 430, a second processor 431, a fourth determiner 440, a third processor 441, a fourth processor 442, a first control requester 450, a first re-determination processor 451, a second control requester 460, and a second re-determination processor 461 as shown in FIG. 1.

Specifically, the first determiner 410 determines whether the color information of the analyzed ROI corresponds to preset first color information, i.e., colorless, on the basis of the result of analysis performed by the image analyzer 300.

In other words, whether a colorless exhaust gas is discharged is determined to determine whether the state of the engine of the vehicle is normal or abnormal.

When the color information of the analyzed ROI corresponds to the first color information, the state of the engine is determined to be normal and no further analysis may be performed.

In this case, when the color information of the analyzed ROI corresponds to the first color information, a notification may be generated to allow a driver to recognize a normal state, but generally, a notification of a vehicle is generated only for an abnormal state not to distract the driver during driving and thus a notification need not be generated when the discharged exhaust gas is determined as a colorless exhaust gas indicating a normal state.

When the first determiner 410 determines that the color information of the analyzed ROI does not correspond to the first color information, the second determiner 420 primarily determines that a fault has occurred in the engine and performs a detailed analysis thereof.

That is, the second determiner 420 determines whether a result of the determination of the first determiner 410 reveals that a default has actually occurred in the engine system or a colored exhaust gas has been discharged due to an external variable of the engine system.

To this end, the second determiner 420 receives information related to a current state of the engine of the vehicle and determines whether the current state corresponds to a regeneration mode.

Specifically, when the first determiner 410 determines that the color information of the analyzed ROI does not correspond to the first color information, the second determiner 420 determines that a filter used in an exhaust unit is in the regeneration mode and thus does not properly operate properly.

For example, carbon compounds accumulated in a diesel particulate filter (DPF) are burnt in a regeneration process, and in this case, a colored exhaust gas may be discharged even when the state of the engine is normal.

The second determiner 420 determines whether the current state of the engine is the regeneration mode, based on such a case.

When the second determiner 420 determines that the current state of the engine is the regeneration mode, the first processor 421 processes the state of the engine of the vehicle as a normal state and performs an operation.

However, because the color information of the analyzed ROI does not correspond to the first color information, it should be understood that notifying of an analysis result is deferred and thus it is preferable to generate a notification to warn a driver that the state of the engine is not determined because the analysis result is deferred and provide the notification through a connected display means (e.g., a head unit or the like).

That is, the state of the engine is determined to be abnormal when the color information of the exhaust gas is taken into account but is determined to be normal on the basis of the situation in the engine system, and therefore, it is preferable to inform the driver of this matter.

Thereafter, when the second determiner 420 determines that when the state of the engine does not correspond to the regeneration mode, the state of the engine of the vehicle is abnormal and thus an operation of identifying a case of the abnormal state of the engine is performed.

When the second determiner 420 determines that state of the engine does not correspond to the regeneration mode, the third determiner 430 determines whether the color information of the analyzed ROI corresponds to preset second color information, i.e., white.

When the third determiner 430 determines that the color information of the analyzed ROI corresponds to the preset second color information, the second processor 431 may provide previously stored first notification generation information through a connected display means.

In this case, when the color information of the exhaust gas is white, the previously stored first notification generation information may be notification generation information about inspecting the leakage of a coolant or mission oil when most frequently occurring faults are considered.

When the third determiner 430 determines that the color information of the analyzed ROI does not correspond to the preset second color information, the fourth determiner 440 determines whether the color information corresponds to preset third color information, i.e., blue.

When the fourth determiner 440 determines that the color information of the analyzed ROI corresponds to the preset third color information, the third processor 441 may provide previously stored second notification generation information through the connected display means.

In this case, when the color information of the exhaust gas is blue, the previously stored second notification generation information may be notification generation information about inspecting the leakage of engine oil when most frequently occurring faults are considered.

In addition, when the fourth determiner 440 determines that the color information of the analyzed ROI does not correspond to preset third color information, an operation of the fourth processor 442 is performed.

In other words, when the fourth determiner 440 determines that the color information of the analyzed ROI does not correspond to the preset third color information, the fourth processor 442 determines whether the color information corresponds to preset fourth color information, i.e., black.

Therefore, when the color information of the analyzed ROI corresponds to the preset fourth color information, the fourth processor 442 may provide previously stored third notification generation information through the connected display means.

In this case, when the color information of the exhaust gas is black, the previously stored third notification generation information may be notification generation information about inspecting a fuel intake system when most frequently occurring faults are considered.

In this case, even though the state of the engine of the vehicle is normal, the analysis processor 400 controls the engine to get out of a severe driving state through the first control requester 450 and the second control requester 460 by taking into account that a black exhaust gas may be generated due to incomplete combustion when a driver is in a severe driving state.

In some cases, the first and second control requesters 450 and 460 may sequentially perform operations or one selected from among the first and second control requesters 450 and 460 may perform an operation, but embodiments are not limited to an order to the operations.

First, the first control requester 450 may control the fourth processor 442 to inform a driver that current color information of an exhaust gas is black and thereafter request a related means to decrease a cutoff frequency of a low-pass filter (LPF) corresponding to an acceleration pedal input value of the vehicle.

When the related means operates in response to the request from the first control requester 450, the first re-determination processor 451 performs the operation of the image collector 200 again and monitors a state of an exhaust gas discharged after the operation of the related means.

The second control requester 460 requests the related means to reduce a degree of openness of an exhaust gas recirculation (EGR) valve of the vehicle.

When the related means operates in response to the request from the second control requester 460, the second re-determination processor 461 performs the operation of the image collector 200 again and monitors a state of an exhaust gas discharged after the operation of the related means.

Here, the first control requester 450 and the second control requester 460 do not forcibly control the related means but request the related means to perform the above operations, because the operations requested by the first and second control requesters 450 and 460 may cause power performance degradation or increase a discharge rate of a nitrogen oxide and thus cannot be arbitrarily controlled. Therefore, it is preferable to request the related means to perform control within a controllable margin section.

In this case, in the analysis processor 400, after the first control requester 450 is operated, the second control requester 460 is sequentially operated when color information of an exhaust gas is determined to be black as a result of performing the operation of the first re-determination processor 451, and the color information of the exhaust gas is analyzed by performing the operation of the second re-determination processor 461 again.

Nevertheless, when the color information of the exhaust gas is black, it is finally analyzed that a fault has actually occurred in the engine system regardless of a driver's driving habit or a severe driving state.

However, when the color information of the exhaust gas is analyzed as a color other than block as a result of performing the operations again by the first re-determination processor 451 or the second re-determination processor 461, it is preferable to determine color information of the exhaust gas, which was analyzed previously due to driving habit of the driver or a severe driving state.

Furthermore, as shown in FIG. 1, the exhaust gas monitoring system according to an embodiment of the present invention may further include an external outputter 500 to provide an analysis result, which is obtained by the image analyzer 300, through a connected display means.

That is, color information of an exhaust gas output from the image analyzer 300 is received instead of a result of analyzing the color information of the exhaust gas by the analysis processor 400 (i.e., engine state result information).

In addition, the exhaust gas monitoring system according to an embodiment of the present invention may further include a storage means to store and manage, in the form of a database, an entire region of image data of the rear of a vehicle obtained by the image collector 200, a ROI image region extracted by the image analyzer 300, color information extraction information obtained through the ROI image region, and a result of analyzing the state of the engine by the analysis processor 400 to store and manage the database to match one another.

Accordingly, when an external user (a driver, a vehicle inspector or the like) may use the above information as a reference material when he or she inspects a state of an engine of a vehicle.

Figure 3:
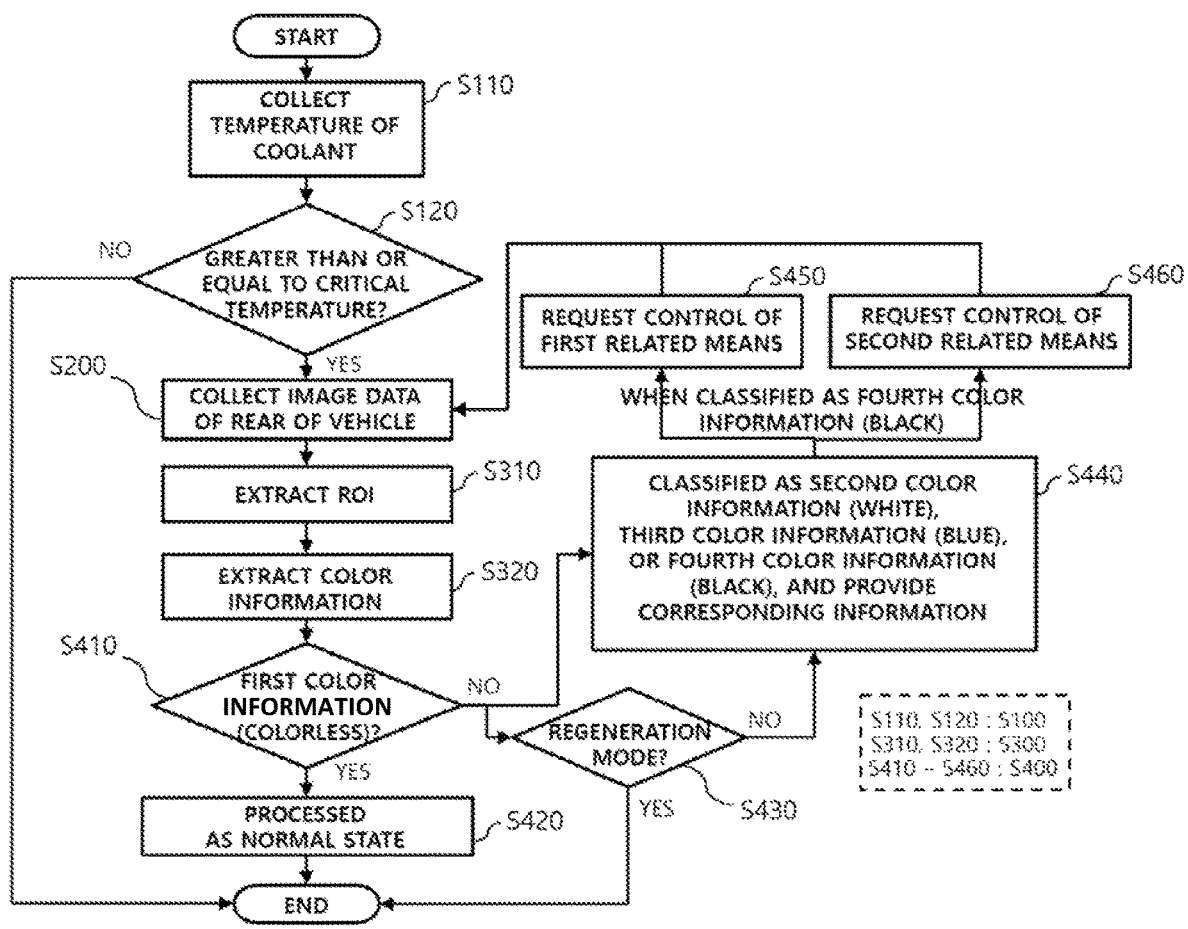
FIG. 3 is a flowchart of an example of an exhaust gas monitoring method according to an embodiment of the present invention.

FIG. 3 is a flowchart of an exhaust gas monitoring method according to an embodiment of the present invention.

As shown in FIG. 3, the exhaust gas monitoring method according to an embodiment of the present invention may include a preheating determination operation (S100), an image input operation (S200), an image analysis operation (S300), and an analysis processing operation (S400). These operations are preferably performed by an exhaust gas monitoring system operated by an operation processing means.

These operations will be described in detail below.

In the preheating determination operation (S100), the initial determiner 100, which is an operation processing means, determines whether to analyze a state of an engine of a vehicle is possible on the basis of color information of an exhaust gas.

That is, it is determined whether color information of a discharged exhaust gas represents a state of the internal combustion engine, i.e., whether the color information is reliable in terms of an analysis, because an engine system of a vehicle to which the exhaust gas monitoring system is applied is sufficiently preheated.

The preheating determining operation (S100) includes a temperature collection operation (S110) and a temperature determination operation (S120) as shown in FIG. 3.

In the temperature collection operation (S110), information about a temperature of a coolant of a corresponding vehicle is received.

A colorless exhaust gas is discharged from an engine in a normal state, but when the engine is not sufficiently preheated, a white exhaust gas including vapor is discharged due to a contraction phenomenon due to a temperature difference between condensed water or cool air and the exhaust gas, and therefore, temperature information of a coolant is received to determine whether the engine is sufficiently preheated.

In the temperature determination operation (S120), whether the temperature information of the coolant received in the temperature collection operation (S110) is higher than or equal to a preset critical temperature is determined, and the state of the engine is processed to be analyzed when the temperature information of the coolant is higher than or equal to the critical temperature.

That is, when the temperature of the coolant is higher than or equal to the critical temperature, it is determined that the engine is preheated sufficiently to analyze the state of the engine through an exhaust gas and a subsequent operation is performed.

Here, the critical temperature should be understood to mean a lowest temperature that is in a normal range that was set in advance during the design of a vehicle, and generally, a temperature of a coolant reaches a critical temperature a certain time after driving of the vehicle starts and thus the critical temperature is not limited.

In the image input operation (S200), the image collector 200, which is an operation processing means, collects image data of the rear of the vehicle that is being driven.

In this case, in the image input operation (S200), the image data of the rear of the vehicle is collected only when in the temperature determination operation (S120), it is determined to analyze the state of the engine by using the color information of the exhaust gas.

The image data of the rear of the vehicle is image data of the rear of the vehicle, which is generated by a rear camera or a surround view monitor (SVM) rear camera system, and embodiments are not limited to a related means that generates the image data of the rear of the vehicle provided that the rear of the vehicle can be monitored.

In the image analysis operation (S300), the image analyzer 300, which is an operation processing means, analyzes the image data of the rear of the vehicle collected in the image input operation (S200) and outputs color information corresponding to an exhaust gas region included in the image data.

As shown in FIG. 3, the image analysis operation (S300) includes a ROI extraction operation (S310) and a color information extraction operation (S320).

In the ROI extraction operation (S310), a ROI is extracted from the image data by using a preset algorithm, i.e., a preset ROI extraction algorithm.

Generally, an SVM rear camera system employs a fisheye lens having a wide angle of view, but an exhaust port region (muffler region) through which an exhaust gas is discharged is located at a center of an image and thus is less distorted by the fisheye lens.

Therefore, an image of the exhaust port region is extracted as a ROI as shown in FIG. 2. Here, a desired region may be easily extracted from among all regions of an image as a ROI through a general ROI extraction algorithm and thus a detailed description thereof will be omitted here.

In the color information extraction operation (S320), class classification is performed on color information of each pixel of the ROI extracted in the ROI extraction operation (S310) using a previously stored network.

Specifically, in the color information extraction operation (S320), a network consisting of a plurality of layers for performing convolution, batch normalization, a ReLU operation, etc. is used, and features of each pixel is abstracted while reducing the size of an output through a pooling operation.

In addition, in order to solve a problem of an XOR classification, two fully connected layers are configured and a SoftMax operation function is applied to convert an output value of a network into a probability value corresponding to a predetermined class for each pixel and output the probability value.

For example, the output value of the network is converted into the sum of a value of probability that a pixel is colorless, a value of probability that the pixel is a white pixel, a value of probability that the pixel is a blue pixel, and a value of probability that the pixel is a black pixel, and the sum of the values of probability is output, and in this case, the sum of all of the values of probability for the pixel is 100%.

In order to diagnose a state of an engine using an exhaust gas, four classes (colorless/white/blue/black) were used, and for supervised learning, a loss value was calculated using a cross entropy loss lce as shown in Equation 1 above.

The color information of the ROI is output using a class classification result output through such a trained network.

That is, a representative value of each pixel is set as a class having a maximum value among SoftMax outputs of pixels by a trained network, and color information is output as a representative value corresponding to a largest number of pixels among all pixels of the ROI.

That is, when the ROI consists of 100 pixels and black is set to a representative value for 90 pixels among the 100 pixels, the color information of the ROI is set to black and is output.

In the analysis processing operation (S400), the analysis processor 400, which is an operation processing means, analyzes the state of the engine of the vehicle on the basis of the analysis result obtained in the image analysis operation (S300).

That is, in the analysis processing operation (S400), the state of the engine (engine system) is analyzed using the color information of the ROI obtained in the image analysis operation (S300).

As shown in FIG. 3, the analysis processing operation (S400) includes a first determination operation (S410), a first analysis operation (S420), a second determination operation (S430), a third analysis operation (S440), a first control request operation (S450), and a second control request operation (S460).

In the first determination operation (S410), whether the color information of the analyzed ROI corresponds to preset first color information, i.e., colorless, on the basis of the result of the analysis performed in the image analysis operation (S320).

In other words, whether a colorless exhaust gas is discharged is determined to determine whether the state of the engine of the vehicle is normal or abnormal.

In the first analysis operation (S420), when it is determined in the first determination operation (S410) that color information of the analyzed ROI corresponds to the first color information, the state of the engine is determined to be normal and thus no further analysis is performed.

In this case, when the color information of the analyzed ROI corresponds to the first color information, a notification may be generated to allow a driver to recognize a normal state, but generally, a notification of a vehicle is generated only for an abnormal state so as not to distract the driver during driving and thus a notification need not be generated when the discharged exhaust gas is determined as a colorless exhaust gas indicating a normal state.

On the other hand, when it is determined in the first determination operation (S410) that when the color information of the analyzed ROI does not correspond to the first color information, the second determination operation (S430) is performed.

That is, in the second determination operation (S430), when the color information of the analyzed ROI does not correspond to the first color information, it is primarily determined that a fault has occurred in the engine and a detailed analysis is performed thereon.

Therefore, in the second determination operation (S430), it is determined whether a result of the determination in the first determination operation (S410) reveals that a default has actually occurred in the engine system or a colored exhaust gas has been discharged due to an external variable of the engine system.

To this end, in the second determination operation (S430), information related to a current state of the engine of the vehicle is received to determine whether the current state corresponds to a regeneration mode.

Specifically, when the color information of the analyzed ROI does not correspond to the first color information, it is determined whether a filter used in an exhaust unit is in the regeneration mode and thus is not operated properly.

For example, carbon compounds accumulated in a diesel particulate filter (DPF) are burnt in a regeneration process, and in this case, a colored exhaust gas may be discharged even when the state of the engine is normal.

Whether the current state of the engine is the regeneration mode is determined by taking into account this matter.

When it is determined in the second determination operation (S430) that the current state of the engine is the regeneration mode, the state of the engine of the vehicle is processed as a normal state and a corresponding operation is performed.

However, because the color information of the analyzed ROI does not correspond to the first color information, it should be understood that notifying of an analysis result is deferred, and thus, it is preferable to generate a notification to warn a driver that the state of the engine is determined as the normal state because the analysis result is deferred and provide the notification through a connected display means (e.g., a head unit or the like).

That is, the state of the engine is determined to be abnormal when the color information of the exhaust gas is taken into account but is determined to be normal on the basis of the situation in the engine system, and therefore, it is preferable to inform the driver of this matter.

The second determination operation (S430) is performed to determine a state of the engine in some cases, i.e., whether the engine is in the regeneration mode, and may not be performed or may be selectively performed in the analysis processing operation (S400).

In the third analysis operation (S440), when it is determined in the first determination operation (S410) that the color information of the analyzed ROI does not correspond to the first color information, the color information is classified as corresponding color information among second color information (white), third color information (blue), and fourth color information (black), and first notification generation information to third notification generation information stored in advance to correspond to pieces of classified color information are provided through a connected display means.

Specifically, when it is determined in the first determination operation (S410) that the color information of the analyzed ROI does not correspond to the first color information and corresponds to preset second color information, previously stored first notification generation information is provided through the connected display means.

In this case, when the color information of the exhaust gas is white, the previously stored first notification generation information may be notification generation information about inspecting the leakage of a coolant or mission oil when most frequently occurring faults are considered.

When it is determined in the first determination operation (S410) that the color information of the analyzed ROI does not correspond to the first color information and corresponds to preset third color information, previously stored second notification generation information is provided through the connected display means.

In this case, when the color information of the exhaust gas is blue, the previously stored second notification generation information may be notification generation information about inspecting the leakage of engine oil when most frequently occurring faults are considered.

When it is determined in the first determination operation (S410) that the color information of the analyzed ROI does not correspond to the first color information and corresponds to preset fourth color information, previously stored third notification generation information is provided through the connected display means.

In this case, when the color information of the exhaust gas is black, the previously stored third notification generation information may be notification generation information about inspecting a fuel intake system when most frequently occurring faults are considered.

In this case, in the analysis processing operation (S400), even though the state of the engine of the vehicle is normal, the first control request operation (S450) and the second control request operation (S460) may further be performed to control the state of the engine to get out of a severe driving state by taking into account that a black exhaust gas may be generated due to incomplete combustion when a driver is in the severe driving state.

In some cases, the first and second control request operations (S450) and (S460) may be sequentially performed or the first or second control request operation (S450) and (S460) may be selectively performed, and embodiments are not limited to an order of these operations.

In the first control request operation (S450), the driver is informed that current color information of the exhaust gas is black and thereafter a related means is requested to control a cutoff frequency of an LPF corresponding to an acceleration pedal input value of the vehicle to be reduced.

When the related means performs the operation in response to the request, a state of an exhaust gas discharged after the operation of the related means is monitored again by performing the exhaust gas monitoring method starting from the image input operation (S200).

In the second control request operation (S460), a related means is requested to control a degree of openness of an EGR valve of the vehicle to be reduced.

When the related means performs the operation in response to the request, a state of an exhaust gas discharged after the operation of the related means is monitored again by performing the exhaust gas monitoring method starting from the image input operation (S200).

In this case, the related means are not forcibly controlled through the first control request operation (S450) and the second control request operation (S460) but are requested to perform the above operations, because the operations requested through the first control request operation (S450) and the second control request operation (S460) may cause power performance degradation or increase a discharge rate of a nitrogen oxide and thus cannot be arbitrarily controlled. Therefore, it is preferable to request the related means to perform control within a controllable margin section.

In the analysis processing operation (S400), when although at least one of the first control request operation (S450) and the second control request operation (S460) is performed again, the color information of the exhaust gas is black, it is finally analyzed that actually, a fault has occurred in the engine system regardless of the driver's driving habit of a severe driving state.

However, when it is analyzed that the color information of the exhaust gas is not black as a result of performing at least one of these operations again, it may be determined that the color information of the exhaust gas analyzed previously is due to the driver's driving habit a severe driving state.

According to an exhaust gas monitoring system and method of the present invention, it is possible to monitor a color of an exhaust gas that a driver cannot check by him or herself during driving, analyze a state of an engine on the basis of a result of the monitoring, and provide an analysis result.

In particular, information about the state of the engine system, which is one of main components of a vehicle, can be provided considering a situation in which a state of an exhaust gas is inaccurately identified, thereby increasing reliability.

That is, an exhaust gas discharged during driving can be monitored continuously to allow a driver to rapidly recognize a fault occurring in a vehicle and maintain an internal combustion engine including the engine system. It may be expected that the lifespan of the engine will be extended due to such rapid maintenance.

In addition, it is likely that the amount of an exhaust gas discharged until the driver recognizes a malfunction of the engine due to a problem during driving and inspects the engine exceeds an acceptable level, thus causing environmental pollution (air pollution or the like), but according to the present invention, environmental pollution can be prevented by monitoring an exhaust gas continuously or recognizing a problem of the engine earlier.

When monitoring an exhaust gas continuously is established by law considering the above-described matter, it is expected that monitoring an exhaust gas can be performed more intensively to prevent air pollution due to internal combustion engine vehicles.

The present invention is not limited to the above-described embodiments, is applicable in various fields, and may be implemented in various forms without departing from the scope of the present invention claimed in the claims.

What is claimed is:

1. An exhaust gas monitoring system comprising:
   an initial determiner configured to determine whether analyzing a state of an engine of a vehicle is possible on the basis of color information of an exhaust gas;
   an image collector configured to perform an operation to collect image data of a rear of the vehicle;
   an image analyzer configured to analyze the image data and output color information corresponding to an exhaust gas region included in the image data; and
   an analysis processor configured to analyze the state of the engine of the vehicle to produce an analysis result based on an analysis of the color information from the image analyzer,
   wherein the image collector collects the image data of the rear of the vehicle only when the initial determiner determines analyzing the state of the engine is possible based on the color information of the exhaust gas;
   wherein the analysis processor comprises:
   a first determiner configured to determine whether the color information from the image analyzer corresponds to preset first color information on the basis of the analysis result;
   a second determiner configured to receive information related to a current state of the engine and determine whether the current state corresponds to a regeneration mode when the first determiner determines that the color information from the image analyzer does not correspond to the first color information; and
   a first processor configured to process the state of the engine as a normal state when the second determiner determines that the current state corresponds to the regeneration mode.

2. The exhaust gas monitoring system of claim 1, wherein the initial determiner comprises:
   a temperature collector configured to receive temperature information of a coolant of the vehicle; and
   a temperature responder configured to determine whether the temperature information of the coolant is higher than or equal to a preset critical temperature and process the state of the engine when it is determined that the temperature information is higher than or equal to the preset critical temperature.

3. The exhaust gas monitoring system of claim 1, wherein the image analyzer comprises:
   an extractor configured to receive the image data of the rear of the vehicle and extract a region of interest (ROI) from the image data by using a preset algorithm;
   a classifier configured to perform class classification on color information for each pixel of the extracted ROI by using a previously stored network; and
   an outputter configured to output the color information of the ROI on the basis of a result of the class classification.

4. The exhaust gas monitoring system of claim 3, further comprising an external output device configured to provide the analysis result obtained by the image analyzer through a connected display.

5. The exhaust gas monitoring system of claim 1, wherein the analysis processor further comprises:
   a third determiner configured to determine whether the color information corresponds to preset second color information when the second determiner determines that the current state does not correspond to the regeneration mode; and
   a second processor configured to provide previously stored first notification generation information through a connected display when the third determiner determines that the color information corresponds to the second color information.

6. The exhaust gas monitoring system of claim 5, wherein the analysis processor further comprises:
   a fourth determiner configured to determine whether the color information corresponds to preset third color information when the third determiner determines that the color information does not correspond to the second color information; and
   a third processor configured to provide previously stored second notification generation information through the display when the fourth determiner determines that the color information corresponds to the third color information.

7. The exhaust gas monitoring system of claim 6, wherein the analysis processor further comprises a fourth processor configured to provide previously stored third notification generation information through the display when the fourth determiner determines that the color information does not correspond to the third color information.

8. The exhaust gas monitoring system of claim 6, wherein the analysis processor further comprises:
   a first control requester configured to request control of a cutoff frequency of a low-pass filter (LPF) corresponding to an acceleration pedal input value of the vehicle to be reduced when the fourth determiner determines that the color information does not correspond to the third color information; and
   a first re-determination processor configured to perform the operation of the image collector again in response to the request from the first control requester.

9. The exhaust gas monitoring system of claim 6, wherein the analysis processor further comprises:
   a second control requester configured to request control of a degree of openness of an exhaust gas recirculation (EGR) valve of the vehicle to be reduced when the fourth determiner determines that the color information does not correspond to the third color information; and
   a second re-determination processor configured to perform the operation of the image collector again in response to the request from the second control requester.

10. The exhaust gas monitoring system of claim 1, wherein the color information output by the image analyzer is determined based on a representative value corresponding to a largest number of pixels of a Region of Interest in the image data.

11. The exhaust gas monitoring system of claim 1, wherein the image analyzer is configured to determine a probability that a pixel of the image data is of each of a number of different colors; and
   a sum of the probabilities for the pixel is 100% and the different colors are colorless, white, blue and black.

12. A method for monitoring an exhaust gas of a vehicle comprising:
   determining in a preheating determination operation whether analyzing a state of an engine of a vehicle is possible on the basis of color information of an exhaust gas;
   collecting image data of a rear of the vehicle in an image input operation when it is determined in the preheating determination operation that it is possible to analyze the state of the engine;
   using supervised learning, analyzing, in an image analysis operation, the image data collected in the image input operation and extracting color information corresponding to an exhaust gas region included in the image data, wherein the supervised learning is trained on data comprising pairs of image data with a correct color determination; and
   determining in an analysis processing operation the state of the engine of the vehicle based on the color information extracted in the image analysis operation;
   wherein the analysis processing operation comprises:
   determining, in a first determination operation, whether the color information corresponds to preset first color information;
   analyzing, in a first analysis operation, the state of the engine of the vehicle as a normal state when it is determined in the first determination operation that the color information corresponds to the first color information; and
   receiving, in a second determination operation, information related to a current state of the engine of the vehicle and determining whether the current state corresponds to a regeneration mode when it is determined in the first determination operation that the color information does not correspond to the first color information.

13. The method of claim 12, wherein the preheating determination operation comprises:
   receiving in a temperature collection operation temperature information of a coolant of the vehicle; and
   determining in a temperature determination operation whether the temperature information of the coolant received in the temperature collection operation is higher than or equal to a preset critical temperature and determining that the state of the engine is to be analyzed when the temperature information is higher than or equal to the preset critical temperature.

14. The method of claim 12, wherein the image analysis operation comprises:
   extracting, in a region-of-interest (ROI) extraction operation, a ROI from the image data of the rear of the vehicle by using a preset algorithm; and
   performing class classification in a color information extraction operation based on color information of each pixel of the ROI extracted in the ROI extraction operation and generating the color information of the ROI based on the class classification.

15. A method for monitoring an exhaust gas of a vehicle comprising:
   determining in a preheating determination operation whether analyzing a state of an engine of a vehicle is possible on the basis of color information of an exhaust gas;
   collecting image data of a rear of the vehicle in an image input operation when it is determined in the preheating determination operation that it is possible to analyze the state of the engine;

using supervised learning, analyzing, in an image analysis operation, the image data collected in the image input operation and extracting color information corresponding to an exhaust gas region included in the image data, wherein the supervised learning is trained on data comprising pairs of image data with a correct color determination; and determining in an analysis processing operation the state of the engine of the vehicle based on the color information extracted in the image analysis operation;

wherein the analysis processing operation comprises:

determining, in a first determination operation, whether the color information corresponds to preset first color information;

analyzing, in a first analysis operation, the state of the engine of the vehicle as a normal state when it is determined in the first determination operation that the color information corresponds to the first color information; and classifying, in a subsequent analysis operation, the color information as one of preset second color information to fourth color information when it is determined in the first determination operation that the color information does not correspond to the first color information, and providing one of previously stored first notification generation information to third notification generation information, which corresponds to the classified color information through a connected display.

16. The method of claim 15, wherein the analysis processing operation further comprises requesting, in a first control request operation, a control to reduce a cutoff frequency of a low-pass filter (LPF) corresponding to an acceleration pedal input value of the vehicle when the color information is classified as the fourth color information in the subsequent analysis operation, wherein, when the control operates according to the first control request operation, the method is performed again starting from the image input operation.

17. The method of claim 15, wherein the analysis processing operation further comprises requesting, in a second control request operation, a control to reduce a degree of openness of an exhaust gas recirculation (EGR) valve of the vehicle when the color information is classified as the fourth color information in the subsequent analysis operation, wherein, when the control operates according to the second control request operation, the exhaust gas monitoring method is performed again starting from the image input operation.

* * * * *